Figure 1:
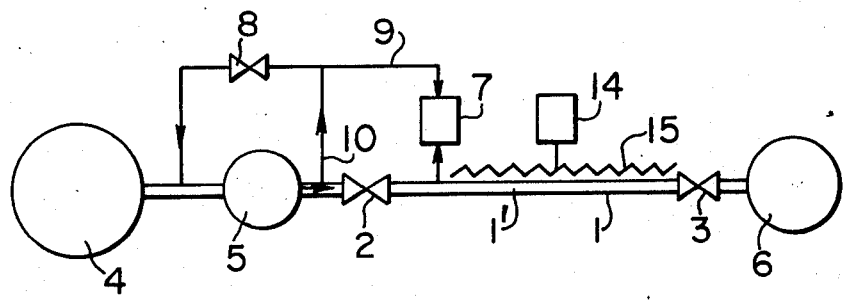

United States Patent [19]
Ando

[11] 3,978,709
[45] Sept. 7, 1976

[54] DETECTION OF LEAKAGE FROM LIQUID-TRANSPORTING PIPELINE

[75] Inventor: Masao Ando, Yokohama, Japan

[73] Assignee: Chisso Corporation, Osaka, Japan

[22] Filed: July 18, 1974

[21] Appl. No.: 489,654

[30] Foreign Application Priority Data

July 19, 1973    Japan.............................. 48-82283
Oct. 8, 1973     Japan.............................. 48-113055

[52] U.S. Cl............................................. 73/40.5 R
[51] Int. Cl.²......................................... G01M 3/08
[58] Field of Search................... 73/40.5 R, 49.1, 40

[56] References Cited
UNITED STATES PATENTS

| | | | |
|---|---|---|---|
| 2,043,227 | 6/1936 | Bennett............................ | 73/40.5 R |
| 3,702,074 | 11/1972 | Mullen............................. | 73/40.5 R |

*Primary Examiner*—Harry N. Haroian
*Attorney, Agent, or Firm*—Fred Philpitt

[57] ABSTRACT

A leakage from a liquid-transporting pipeline containing a liquid to be transported and being blocked into at least one block by block valves is detected by a system comprising a piping connected to the pipeline in parallel with anyone of block valves forming at least one of blocks in the pipeline, the piping being capable of passing the liquid to or from the block, a means for supplying the liquid to the block under a desired pressure through the piping, thereby maintaining the pressure of the liquid within the block as constant as possible, and further a means for measuring the amounts of the liquid passed to or from the block in the piping, thereby detecting a leakage of the liquid from the block, based on the measured amounts the liquid passed to or from the block.

10 Claims, 2 Drawing Figures

DETECTION OF LEAKAGE FROM LIQUID-TRANSPORTING PIPELINE

DESCRIPTION OF THE INVENTION

This invention relates to a method and a system for detecting a leakage from a liquid-transporting pipeline, and more particularly to a method and a system for minimizing a pressure change due to a temperature change of a liquid within a blocked pipeline containing the liquid to be transported, and detecting a leakage of the liquid from the blocked pipeline.

Recently, oil, for example, fuel oil, has been transported through a pipeline ranging from several kilometers to several tens of kilometers, and it is important to detect a leakage of a liquid from the pipeline which contains and transports the liquid.

In view of the economy of the pipeline operation, it is desirable to maintain the liquid in the pipeline in a continuously flowing state, but the liquid is not always in the continuously flowing state owing to operational considerations, and sometimes it is in an interrupted or non flowing state. In the case of an interruption or stoppage, it is desirable to block the pipeline by block valves to thereby form one block or a plurality of blocks. This prevents the liquid from flowing out of the pipeline along the entire length of the pipeline or even from a group of tanks connected to the pipeline, when a part of the pipeline is damaged by an accident such as earthquake, etc., during the interruption or stoppage of the liquid flowing through the pipeline. However, when the liquid retained in a block of the blocked pipeline either undergoes a change in climatic temperature or is heated by a heating means, e.g., steam tracing as in a pipeline of fuel oil, the liquid will be expanded or contracted according to the change in liquid temperature, and consequently the pressure within the block will be increased or decreased. In the case of an increase in the pressure within the block, there will be a danger of destruction of the pipeline. In the case of a decrease in the pressure, it is difficult to judge whether the decrease in the pressure is due to a leakage of the liquid from the block or due to the decrease in the liquid temperature.

An object of the present invention is to prevent the danger of destruction of a pipeline, and facilitate detection of a leakage of a liquid from the pipeline.

According to the present invention, a piping is connected to the pipeline in parallel with any one of the block valves forming at least one of the blocks in the pipeline containing the liquid and being blocked into at least one block by the block valves, the piping being capable of passing the liquid to or from the block; a means for supplying the liquid to the block under a desired pressure through the piping is provided, thereby maintaining the pressure of the liquid within the block as constant as possible; and further a means for measuring the amounts of the liquid passed to or from the block is provided in the piping, a leakage of the liquid from the block being detected based on the amounts of the liquid passed to or from the block.

The pipeline may be branched. To form a block extending over the branch, it is of course necessary to provide a block valve in the branched line and block the branched line.

The piping which is connected to the block at one end is usually connected, at other end, to a part of the pipeline connecting to a tank, but in a pipeline including at least two blocks, the piping may be connected, at other end, to another block which may be similarly provided with a piping extending over a block valve, a means for supplying the liquid under the desired pressure and a means for measuring a flow rate of the liquid.

In measuring the rate of passing the liquid to or from the block to detect an amount of leakage of the liquid from the block, the amount of leakage is directly displayed on a flow rate meter, where there is no change in the liquid temperature in the block of the blocked pipeline. However when there is a change in the liquid temperature, the amount of leakage must be calculated from the rate of passing the liquid to or from the block, taking into account a volume change due to a change in the liquid temperature. Especially in the pipeline heated by a heating means, e.g., an electrical heating means, there are cycles of heating and cooling, and it is necessary to take the change in the liquid temperature into calculation.

In the heated pipeline, the calculation of the amount of leakage, based merely on the measurement of the rate of passing the liquid to or from the block, is effective for a pipeline whose diameter is as small as several tens of centimeters or smaller, and whose length is as short as several hundreds of meters or shorter. However, in the case of larger and longer pipeline, an amount of the liquid to be passed through a flow rate meter will be increased owing to an increase in volume change due to a change in the liquid temperature in the pipeline, and the sensitivity of the flow rate meter is lowered for a small amount of leakage. For example, in a fuel oil pipeline, it is desirable to detect an amount of leakage in such a degree of about 10 liters per hour, but in a fuel oil pipeline having a diameter of 300 mm and a block distance of 10 km, there is a volume change of fuel oil by about 500 liters with a temperature change by 1°C. However, such a fuel oil pipeline is heated along its length to maintain the pipeline at 50°C or higher, and a temperature change by maximum 1°C per hour is not rare in the initial period of heating or cooling. Thus, since 500 liters per hour of fuel oil is passed through a flow rate meter in the heating or cooling in said pipeline, the amount of leakage of said 10 liters per hour will be 2% with respect to said flow rate of the fuel oil, and the detection of leakage will be difficult. Therefore, it is necessary to make the block distance shorter than a specified length, e.g., said 10 km, or to wait for the leakage detection until the temperature of the pipeline has reached the ambient one, for reducing the effect of the temperature change.

However, the former measuring process of making the block distance shorter will complicate the structure of the pipeline, while the latter measuring process of waiting for the leakage detection will prolong a period of interruption or stoppage of the pipeline. Especially in the heated fuel oil pipeline, although the temperature change is gentle owing to the thermal insulation of the pipeline, it needs much time in bringing the pipeline into a stationary state, which results in reducing the utility rate of the pipeline.

According to one of the procedures for detecting the leakage from a block of blocked and heated pipeline having such a long distance with a high accuracy, the amount of leakage from the block is detected by carrying out a cycle of cooling and heating of the pipeline once or a plurality of times, measuring the amount of the liquid passed to the block when the pipeline is cooled and the amount of the liquid passed from the block (minus amount) when the pipeline is heated, by means of the flow rate meter, and calculating the sum total of these two amounts.

According to another procedure, the amount of leakage from a block is detected by giving an amount of heat, Q, to the block so that the following formula may be kept as nearly to zero as possible:

$$Q/\alpha - (\theta_0 - \theta_a)$$

wherein:
 $Q$: amount of heat per unit length of pipeline
 $\alpha$: heat loss per unit length of pipeline per unit temperature
 $\theta_0$: liquid temperature in pipeline
 $\theta_a$: ambient temperature of pipeline, and measuring the amount of the liquid passed to or from the block or both the amounts of the liquid passed to and from the block by means of the flow rate meter. Now, the present invention will be illustrated by way of the accompanying drawings.

Figure 2:
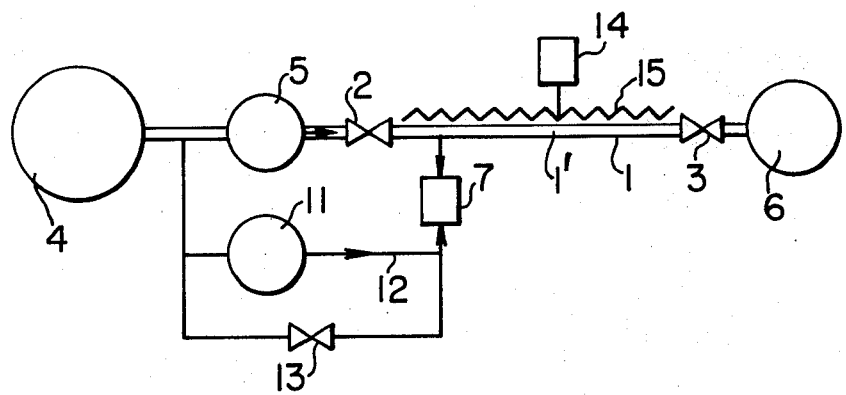

FIGS. 1 and 2 are schematic views of pipelines for two embodiments of the present invention.

In FIG. 1, a pipeline 1 is provided with block valves 2 and 3 at both ends of the pipeline 1. Now, it is presumed that the block valves are closed and liquid transportation is in an interrupted state. There is a block 1' between the block valves 2 and 3. In the case of a long pipeline, at least three block valves may be provided to provide at least two blocks. For brevity of explanation, an example of only one block is illustrated in the drawings.

Numeral 4 shows a liquid storage tank on the feeding side, numeral 5 shows a main liquid-feed pump, and numeral 6 shows a liquid receiver tank. Numeral 8 shows a throttle valve, and numeral 7 shows a means for measuring the flow rate of the liquid to or from the block 1', and the valve 2 is in parallel with conduits 10 and 9, and the means 7. Further, the pump 5 is in parallel with the conduit 10 and the valve 8. The pump 5 and the valve 2 connected to the pipeline 1 in series are in parallel with the means 7 and the conduit 9 and valve 8, as shown in FIG. 1.

When the liquid is to be supplied to the block 1' by means of pump 5 under a certain range of pressure on its output side, the liquid is circulated through the conduit 10 and the open valve 8 from the pump 5, as shown by arrow, if the liquid temperature of the block is constant and there is no leakage. However, if the liquid temperature of the block 1' decreases, the liquid is supplied to the block through the means for measuring the flow rate in an amount of the liquid corresponding to the reduction in the liquid volume due to the decrease in the liquid temperature. When the liquid temperature is increased, the liquid flows in the reversed direction. The two arrow marks at the means 7 show this relation. The throttle valve 8 is adjusted so that the pressure in the block 1' can take a constant value, but a very exact constant pressure is not necessary. In this manner, the pressure within the block 1' is balanced with the pressure of the pump 5, and is kept in a constant range, irrespective of the liquid temperature.

However, even if there is a leakage of the liquid from the block 1', the liquid is supplied to the block 1', in an amount corresponding to the amount of the leakage, by the pump 5, so long as the system is in such a state as described above, and it is impossible to find out the leakage by the decrease in pressure in the block according to the conventional, well-known procedure. In the present invention, the amounts of the liquid passed to or from the block through the means 7 are measured to detect the leakage. Furthermore, it is possible to give the alarm of a leakage in the event that an amount of the liquid to be passed to or from the block 1' is in excess of or short of an anticipated amount proportional to the temperature change of the liquid under the constant pressure, respectively.

In FIG. 1, the main liquid-feed pump 5 is used to supply the liquid to the block 1', but it is sufficient that the pumping capacity for the foregoing purpose is only a fraction of the capacity of the main pump 5 even when the rate of change in the liquid temperature or finding of a leakage is taken into account.

Therefore, in FIG. 2, an auxiliary pump 11 of small capacity is used for that purpose without utilizing the main pump 5. Among numerals used in FIG. 2, the same numerals as in FIG. 1 have the same meanings as in FIG. 1. In FIG. 2, the auxiliary pump 11 supplies a pressure as well as the liquid to the block 1'. Numeral 13 shows a throttle valve. In this case, the liquid only circulates through the pump 11, the conduit 12 and the valve 13 when there is no leakage of the liquid from the block 1' and the liquid temperature is kept constant. However, when there is a leakage of the liquid from the block 1' or a change in the liquid temperature, the liquid will pass through the means 7 for measuring the flow rate, and it is possible to adjust a pressure of the block 1' and find out a leakage from the block for the same reasons as shown referring to FIG. 1.

Now, a procedure for detecting a leakage from a block of the blocked, heated pipeline having a long distance with a high accuracy will be illustrated by way of formulae and numerical values. In this case, a heating source 14 and a heating means 15 are in operation. In this procedure, an electric heating is a preferable heat source.

Let symbols be given as follows:
 $\gamma(°C^{-1})$: Coefficient of volume expansion of liquid.
 $V(m^3)$: Volume of liquid in a blocked pipeline at temperature $\theta_0$ °C.
 $\Delta l(m^3/h)$: Amount of leakage from pipeline.
 $\Delta V_1(m^3)$: Reduction in volume of the liquid when the temperature is decreased by $\Delta\theta$ by cooling of the pipeline.
 $\Delta V_2(m^3)$: Increase in volume of the liquid in the pipeline when heating is effected by Q. (streaming direction to the pipeline is taken as plus)
 $Q(watt/m)$: Amount of heating per m of the pipeline.
 $\alpha(watt/m\ °C)$: Heat loss per meter run of the pipeline per °C.
 $K(h)$: Time constant of the temperature of the pipeline.
 $\theta(°C)$: Temperature of the pipeline.
 $\theta_a(°C)$: Ambient temperature of the pipeline.
 $\theta_0(°C)$: Temperature of the pipeline at time $t(h) = 0$.

Since $$\Delta V_1 = V\gamma\Delta\theta \qquad 1.$$

the rate of the liquid, $dV_1/dt$, passed to the pipeline block through the flow rate meter is:

$$\frac{dV_1}{dt} = \frac{d\theta}{t/k}V_\gamma \quad\quad (2)$$

$\theta$ is generally given as follows:

$$\theta - \theta_a = \frac{Q}{\alpha}(1 - e^{-t/k}) + (\theta_0 - \theta_a)e^{-t/k} \quad\quad (3)$$

In the cooling, that is, $Q = 0$, $dV_1/dt$ will be given from the formulae (2) and (3) as follows:

$$\frac{dV_1}{dt} = \frac{V\gamma(\theta_0 - \theta_a)}{K}e^{-t/k} \quad\quad (4)$$

In the heating, $dV_2/dt$ will be given as follows:

$$\frac{dV_2}{dt} = \frac{V\gamma}{K}[-\frac{Q}{\alpha} + (\theta_0 - \theta_a)]e^{-t/k} \quad\quad (5)$$

When $\Delta l$ is added to the respective formulae (4) and (5), the amounts of the liquid passing through the flow rate meter 7, that is, $S_1$ and $S_2$, and the sum total of them $S$ are given as follows:

$$S_1 = \frac{V\gamma(\theta_0 - \theta_a)}{K}e^{-t/k} + \Delta l \quad\quad (4')$$

$$S_2 = \frac{V\gamma}{K}[-\frac{Q}{\alpha} + (\theta_0 - \theta_a)]e^{-t/k} + \Delta l \quad\quad (5')$$

$$S = S_1 + S_2 = \frac{V\gamma}{K}[-\frac{Q}{\alpha} + 2(\theta_0 - \theta_a)]e^{-t/k} + 2\Delta l \quad\quad (6)$$

When the following numerical values, which are values of common sense in a fuel oil pipeline having a diameter of 300 mm and a distance of 10 km, (units being given above), are put into the formulae (4') and (5'), $\gamma = 0.7 \times 10^{-3}; V = 730; \Delta l = 10 \times 10^{-3};$
$Q/\alpha = 50/0.63 = 80; K = 70.5; \theta_0 = 50,$
and $\theta_a = 15,$
$S_1 = 263$ l/h, $S_2 = -316$ l/h         7.

are given from the formulae (4') and (5') at $t = 0$.
Thus, the sum total $S$ of $S_1$ and $S_2$ will be:

$$S = S_1 + S_2 = -53 \text{ l/h} \quad\quad 8.$$

The amount of leakage, $\Delta l = 10$ l/h, is considerably small for $S_1$ or $S_2$, but $2\Delta l = 20$ l/h is as large as 40% for $S = -53$ l/h. Thus, the detection of the leakage can be carried out with a high accuracy.

Now, explanation will be made in detail below.
Suppose the pipeline be in operation constantly about at $\theta_0 = 50°C$.

When a leakage of a liquid in a pipeline 1 between the valves 2 and 3 is to be detected, the valves 2 and 3 are closed, and also the heating is interrupted. Flow rate of the flow rate meter 7 is read immediately (at $t = 0$). $S_1 = 263$ l/h will be read on the flow rate meter. The necessary time for reading will be as sufficient as 10 minutes. Since the time constant of the pipeline is 70.5 hours, the pipeline does not so simply undergo temperature change, thus during the 10 minutes the pipeline undergoes decrease in temperature by about 0.2°C, and the temperature may be regarded as substantially 50°C at $t = 0$.

Then, heating is started, and the flow rate meter 7 is read. The reading will be $S_2 = -316$ l/h. The necessary time for reading will be also as sufficient as 10 minutes, and $t = 0$ and $\theta_0 = 50°C$ can be taken. It is of course possible to see the direction of flow, and thus the sum total, $S$, can be obtained as a result of the foregoing two actual measurements:

$$S = 263 - 316 = -53 \text{ l/h}$$

On the other hand, when S at $\Delta l = 0$ is designated as $S_0$ and $t = 0$ is put in the formulae (4) and (5), the following formula will be obtained:

$$S_0 = -73 \text{ l/h} \quad\quad 9.$$

If the foregoing results from the calculation are confirmed by actual measurements in advance, much better result can be obtained.

Since the difference from S against $S_0 = -73$ l/h is $2\Delta l = 20$ l/h, it is possible to detect $\Delta l$ down to much smaller value according to the present method.

As explained above, the total necessary time is 20 minutes according to the present method, and one hour is sufficient even with an allowance. Whereas according to the conventional process, it is necessary to await the measurement until the temperature of the pipeline approaches the ambient temperature. In this case, in order to measure a leakage $\Delta l$ with the same accuracy, the necessary waiting time is obtained as a time for rendering the value of the first term of the right side of the formula (4'), one-half of 73 l/h, that is, 36 l/h. That is, $t = 135$ h, and more than 5 days must be awaited. This will lower the utility rate of the pipeline, and if there actually takes place a leakage during that waiting time, there is a great danger.

Further, in the heated pipeline, the item $[-Q/\alpha + (\theta_0 - \theta_a)]$
in the formula (5') may be taken as 0 to facilitate the detection of $\Delta l$. For this purpose, it is necessary to adjust $Q$. In this case, $\Delta l$ is sufficiently large against the error of measurement of $S_2$.

In the heated pipeline, design is very often made under such a condition as:

$$-Q/\alpha + 2(\theta_0 - \theta_a) \to 0$$

In this case, if the procedure of formula (6) is employed, it is in general not necessary to adjust $Q$.

In the foregoing explanation, an electric resistance heating is illustrated, but in the case of other heat source, $\theta_m$, as given below, can be approximately taken as a heat source temperature in the formula (3):

$$\theta_m = Q/\alpha$$

As explained above, for example, a leakage of 10 l/h can be detected for a given flow rate of 300 m³/h through a pipeline with an interruption of the pipeline for about 20 minutes, and thus even when a cycle of cooling and heating is carried out several times for exact measurement, the necessary time is about 1 hour, and its effect is remarkable.

What is claimed is:
1. A system for measuring leakage from a liquid-containing pipeline that includes a liquid inlet end, a liquid outlet end, and a pair of spaced apart block valves mounted between said inlet and outlet ends to form a blocked section of pipeline between said pair of spaced apart valves; the improvement comprising

1. pump means located exteriorly of said blocked section
2. a first flow path connecting the discharge side of said pump means and the suction side thereof,
3. a throttle valve operatively mounted in said first flow path for establishing a minimum pressure that the pump means has to generate in order to cause liquid to flow back to the suction side of the pump means,
4. a second flow path connecting said blocked section of said pipeline and a point on first flow path between said throttle valve and the discharge side of said pump means, and
5. means for measuring the amount of any liquid flowing through second flow path.

2. A system in accordance with claim 1 wherein said means for measuring the amount of liquid flowing through said second flow path is a measuring instrument operatively mounted in said second flow path.

3. A system in accordance with claim 1 wherein said pump means is operatively mounted in the pipeline on the side of said pipeline between the inlet end of said pipeline and the blocked valve nearest said inlet end of said pipeline.

4. A system in accordance with claim 1 wherein said pump means is not a part of the pipeline.

5. A system in accordance with claim 1 wherein a heating means is operatively mounted along the entire length of the blocked section.

6. A system in accordance with claim 1 wherein an electrical heating means is operatively mounted along the entire length of the blocked section.

7. A method for detecting leakage from a liquid-containing pipeline having a liquid inlet end, a liquid outlet end and a pair of spaced apart block valves mounted between said inlet and outlet ends comprising the steps of
1. closing said pair of spaced apart block valves to form a blocked section of pipeline containing liquid,
2. establishing a first circulating flow path for pipeline fluid at a point outside said blocked section,
3. controlling the flow of circulating pipeline fluid in said first circulating flow path by means of a throttle valve,
4. causing a portion of the liquid in said first flow path to flow into said blocked pipeline section through a second flow path when the liquid pressure in said first circulation path is below a certain pressure, and
5. measuring the amount of liquid flowing through said second flow path.

8. A method in accordance with claim 7 wherein the amount of any liquid following said second flow path is measured by means of a measuring instrument mounted in said second flow path.

9. A method in accordance with claim 7 wherein the liquid in the blocked section is heated and cooled at least once; the amount of any liquid following the second flow path is measured during at least one of said heating periods and again during at least one of said cooling periods; and the difference between the measured amount of liquid flowing during said heating period and said measured amount of liquid flowing during said cooling period is determined.

10. A method in accordance with claim 7 wherein the blocked section is supplied with an amount of heat per unit length of pipeline sufficient to maintain the quantity:

$$Q/\alpha - (\theta_o - \theta_a)$$

wherein
$Q$ = the amount of heat supplied per unit length of pipeline,
$\alpha$ = the heat loss per unit length of pipeline per unit of temperature,
$\theta_o$ = the temperature of the liquid in the pipeline, and
$\theta_a$ = the ambient temperature of the pipeline,
approximately equal to 0; and the amount of any liquid following the second flow path is measured when said quantity is approximately 0.

* * * * *